E. I. GORHAM.
CULTIVATOR ATTACHMENT.
APPLICATION FILED MAR. 18, 1912.
1,062,329.
Patented May 20, 1913.
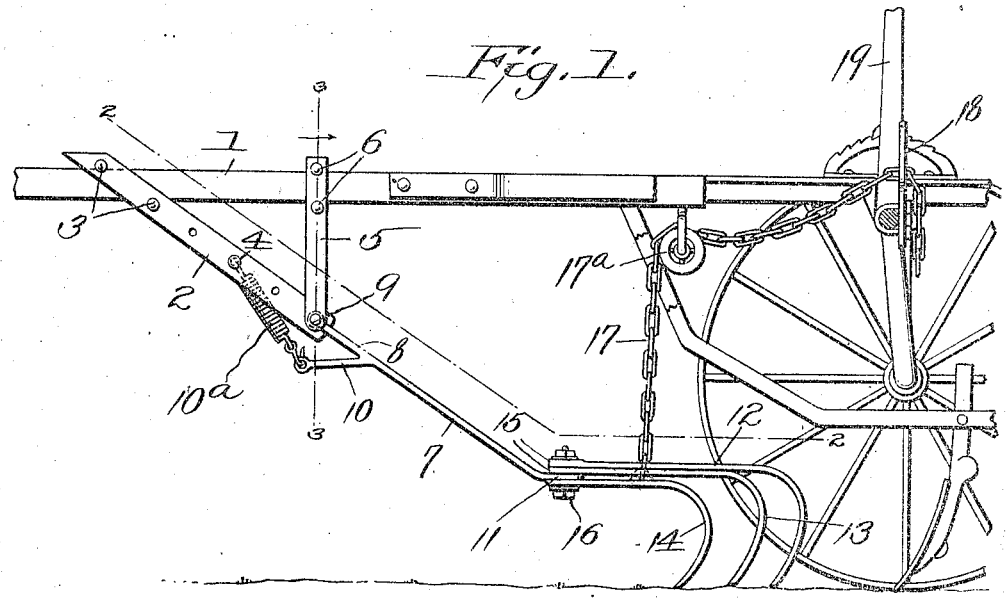
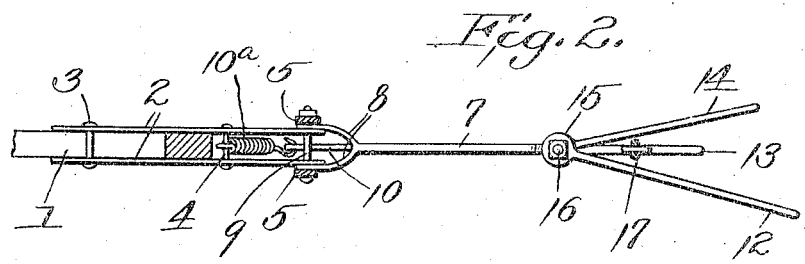
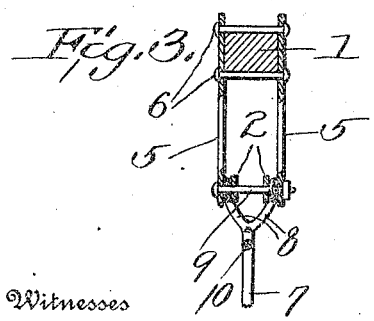
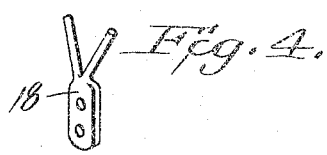
Witnesses
Inventor
E. I. Gorham

UNITED STATES PATENT OFFICE.

EUGENE I. GORHAM, OF MOUNT UNION, IOWA.

CULTIVATOR ATTACHMENT.

1,062,329.

Specification of Letters Patent.

Patented May 20, 1913.

Application filed March 18, 1912. Serial No. 684,620.

*To all whom it may concern:*

Be it known that I, EUGENE I. GORHAM, a citizen of the United States, residing at Mount Union, in the county of Henry and State of Iowa, have invented a new and useful Improvement in Cultivator Attachments, of which the following is a specification.

This invention relates to an attachment for cultivators, and is adapted for use as a stalk remover and can also be used as a harrow in leveling down hills, removing old stalks at the same time, and the device can also be used as a weeder, and as such it is especially adapted for use in cultivating across the rows in small corn.

The special object of the invention is to throw the stalks to one side pushing them into a position parallel with the furrow being turned so that they will not catch upon the shanks and fenders of the cultivator. In plowing small corn an old stalk which is lying straight across the row will catch upon the fender and lift the same thus allowing the dirt to cover the small corn, whereas with my attachment in position the stalk will be brought into alinement with the rows and be covered.

The invention consists of the novel features of construction hereinafter described, pointed out in the claim and shown in the accompanying drawings, in which:

Figure 1 is a side elevation. Fig. 2 is a section on the line 2—2 of Fig. 1. Fig. 3 is a section on the line 3—3 of Fig. 1. Fig. 4 is a detail perspective view of a chain holder.

In these drawings 1 represents the beam of any desired type of cultivator, and hung obliquely and rearwardly from said beam are two parallel bars 2 which are held upon the beam by means of bolts 3, the bolts passing respectively across the top and bottom of the beam. The bars are also provided with suitable openings through which a bolt 4 can be passed. A second set of bars 5 hanging vertically from the beam 1 being secured in place by a transverse bolt 6. A rod 7 has its upper end forked as shown at 8 and a bolt 9 passes through said forks and through the lower overlapping end portions of the bars 2 and 5, thus pivotally securing all of these parts together. Between the forks 8 there branches an arm 10, and a spring 10ª has one end secured to the arm and the other end to the bolt 4. The lower end of the rod 7 is provided with an eye 11 which sets at an angle to the rod and secured thereto are curved spring teeth 12, 13 and 14, the said teeth being of unequal length and each tooth having its shank terminating in an eye 15. Its eyes are placed in vertical alinement with the eye 11 and all of the teeth are secured to the rod 7 by a bolt 16 which passes through the eyes 11 and 15. These teeth may be spread at any suitable angle to each other, the tooth 13 which is designed for uprooting dead stalks being preferably placed in the center, said tooth being the shortest and being provided with an eye to which is secured the end of a chain 17 said chain runs over a suitable pulley 17ª and through a forked chain holder 18 which is secured upon the drop axle shaft of the cultivator, which is operated by a lever 19. The shaft and the lever are parts of the ordinary cultivator. It will be obvious that by spreading the teeth the stalks can be thrown either to the right or to the left, according to the manner in which the teeth are positioned, and they can be set so as to engage the stalks at any desired angle, thus throwing them to one side instead of gathering them and carrying them along in advance of the cultivator. This attachment of the teeth also permits the device to be used in leveling hills and rows and also in weeding.

What I claim is:—

A device of the kind described, comprising parallel bars adapted to be hung from a cultivator frame in an oblique position, a pair of vertically suspended bars overlapping the bars first mentioned, a rod provided with a forked upper end, a bolt passing through said forked ends and through said bars thereby pivotally connecting the bars and the rod, a branched arm carried by the forked portion of the rod, a spring having one end connected thereto, a bolt adjustably carried by the first mentioned bars, the opposite end of the spring being secured to said bolt, a curved tooth pivotally connected to the lower end of the rod, and a chain secured to said teeth, as and for the purpose set forth.

EUGENE I. GORHAM.

Witnesses:
 FRANK HALL,
 W. R. BUCHANAN.